(12) United States Patent
Harder et al.

(10) Patent No.: US 9,037,352 B2
(45) Date of Patent: May 19, 2015

(54) STEERING DEVICE WITH ELECTRICAL STEERING GEAR AND METHOD FOR CONTROLLING OF SAME

(71) Applicant: GM Global Technology Operations LLC, Detroit, MI (US)

(72) Inventors: Michael Harder, Bodenheim (DE); Klaus Menk, Ellern (DE); Werner Schleidt, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 156 days.

(21) Appl. No.: 13/828,753

(22) Filed: Mar. 14, 2013

(65) Prior Publication Data

US 2013/0253768 A1 Sep. 26, 2013

(30) Foreign Application Priority Data

Mar. 21, 2012 (DE) .......................... 10 2012 005 780

(51) Int. Cl.
 *B62D 5/04* (2006.01)
(52) U.S. Cl.
 CPC ............ *B62D 5/0463* (2013.01); *B62D 5/0469* (2013.01)
(58) Field of Classification Search
 CPC ................................ B62D 15/025; B60T 8/30

USPC ....................................... 701/41–42; 180/443
See application file for complete search history.

(56) References Cited

U.S. PATENT DOCUMENTS

| 6,240,350 | B1 | 5/2001 | Endo | |
|---|---|---|---|---|
| 2003/0200018 | A1 | 10/2003 | Arimura | |
| 2004/0187600 | A1 | 9/2004 | Moriguchi | |
| 2005/0087388 | A1* | 4/2005 | Turner et al. | 180/446 |
| 2012/0083972 | A1* | 4/2012 | Gruener et al. | 701/41 |

FOREIGN PATENT DOCUMENTS

| DE | 198 21 024 A1 | 11/1998 |
|---|---|---|
| DE | 199 04 040 A1 | 8/2000 |
| DE | 102 61 001 A1 | 7/2004 |
| DE | 692 33 357 T2 | 6/2005 |
| DE | 10 2010 032 043 A1 | 1/2012 |
| JP | 10310073 A * | 11/1998 |
| JP | 2003-285759 A | 10/2003 |

* cited by examiner

*Primary Examiner* — Dalena Tran
(74) *Attorney, Agent, or Firm* — John A. Miller; Miller IP Group, PLC

(57) ABSTRACT

The present invention relates to a method for controlling an electrical steering gear for a motor vehicle, especially a passenger car, wherein an effective force applied to a steering linkage is detected and a tractive force applied by the electrical steering gear is preset based on the condition that a load acting on the steering linkage does not exceed a preset load limit value.

17 Claims, 2 Drawing Sheets

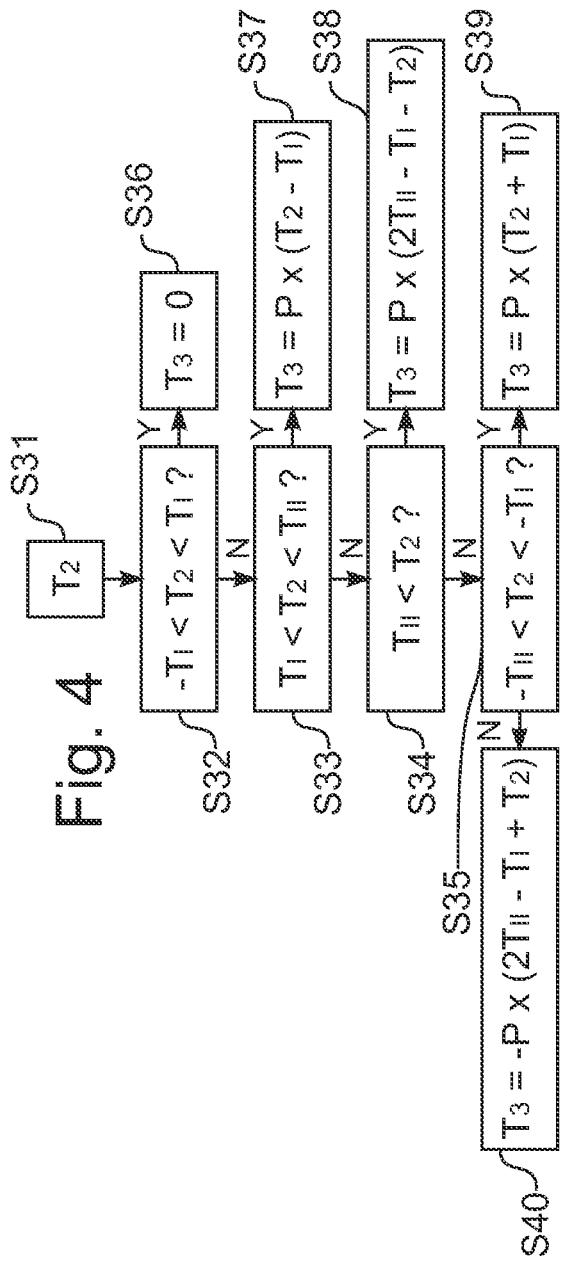

STEERING DEVICE WITH ELECTRICAL STEERING GEAR AND METHOD FOR CONTROLLING OF SAME

Figure 2:
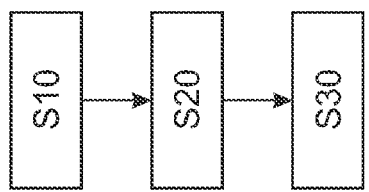

The present invention relates to a steering device for a motor vehicle, especially a passenger car, having an electrical steering gear to exert a tractive force on a steering linkage, a method and a computer program for controlling the electrical steering drive as well as computer program product with such a computer program.

Customarily in a passenger car, a steering wheel is mechanically coupled via a steering linkage with the wheels, so that if the steering wheel is turned, the wheels turn.

From US 2004/0187600 A1, an electric motor is known, which is coupled via a skid coupling with a steering rack. The output torque of the electric motor, up to an upper limit, is preset proportional to a torque in the steering linkage. If the torque in the steering linkage exceeds the upper limit for a preset period of time, the output torque is reduced, to reduce the current consumption of the electric motor.

In the steering device known from US 2004/0187600 A1, the torque in the steering linkage and the output torque of the electric motor are summed into an overall force which is transmitted by the tie rods to the wheels. If the driver turns the steering wheel while the wheels are hemmed in, due to a curb, for example, this correspondingly causes the tie rods to undergo high compression and tensile stresses. Therefore they must be designed to be weighty, which increases the weight and thus the fuel consumption of the vehicle.

The task of the present invention is to make available a better motor vehicle.

This problem is solved by a method, especially one implemented by computer, for controlling an electrical steering gear with the features of claim 1. Claims 9 to 12 claim protection for a steering device for a motor vehicle with a controller to control an electric steering drive as well as a computer program or a computer program product, especially a storage medium or a machine-readable data carrier, which is set up to implement such a method. Advantageous embodiment forms of the invention are the subject of the subordinate claims.

According to one aspect of the present invention, a steering device for a motor vehicle, especially a passenger car, exhibits a steering means, which a driver can control. A steering means according to the present invention can especially exhibit a steering wheel, a control stick or the like, and especially be one.

The steering device exhibits a steering linkage to steer the wheels of the motor vehicle. The steering linkage especially can especially comprise a one- or multiple-part drag link, which is coupled with the steering means, one or more one- or multiple-part tie rods, steering racks, steering levers, transmissions and the like. Especially components that are coupled hydraulically directly or via additional components with a steerable motor vehicle wheel, can form a steering linkage according to the present invention.

The steering device additionally exhibits an electrical steering drive for exerting a tractive force on the steering linkage. The electrical steering drive may comprise one or more electric motors. One or more electric motors can be coupled rigidly or via a detachable coupling with the steering linkage.

Here a torque, i.e., an anti-parallel force couple, is likewise generally designated as a force for more concise description. Thus, when a tractive force, active force, load or the like is mentioned, this can equally be understood as a force acting as a bound vector, as a torque acting as a free vector, or also for example tensional, compressional, bending or torsional stress related to a surface, i.e., as stress, which correspondingly covers a force and covers a torque or a stress.

One or more electric motors can exert a tractive force parallel to an active force on the steering linkage exerted by the driver on the steering linkage. For this, for example, a worm gear can be situated between an electric motor and a steering rack parallel to a worm gear between a drag line and the steering rack. Additionally or alternatively, one or more electric motors can exert a tractive force on the steering linkage serially with an active force exerted by the driver on the steering linkage. For this, for example, an electric motor can apply an additional torque on a steering linkage. In both forms, the tractive and active force act cumulatively ("electric power steering"). In the same way the steering means can be mechanically uncoupled from the wheels, so that only the tractive force ("steer by wire") of the electrical steering drive acts on them.

Additionally the steering device comprises a detection means to detect a force acting on the steering linkage. The detection means especially can exhibit one or more torque sensors. In a preferred embodiment, it exhibits one or more tensile strip charts, piezoelements or the like, which can be placed on a drag link coupled with the steering means.

In addition the steering device has controls for governing the electrical steering drive. This can especially exhibit a computing means for data processing as well as a storage medium for storage of data and programs, and for example govern a supply voltage of one or more electric motors of the electric steering drive. Designated here as governing, for more concise description, is also a regulating, i.e., presetting of a control quantity based on a comparison of a preset target quantity and a detected de facto quantity. The controls can especially comprise a digital microprocessor unit (CPU) data-connected with a storage system and a bus system. Preferably the CPU is configured to process commands which are executed in a program situated in a storage system, to detect input signals from a data bus and/or issue output signals to the data bus. The storage system may comprise various storage media such as optical, magnetic, solid and/or other permanent media. The program can be so constituted that it embodies the method described here or is capable of carrying it out so that the CPU can execute the steps of such methods and thus can govern the steering device.

The tractive force exerted by the electrical steering drive is preset based on the condition that a load acting on the steering linkage does not exceed a preset limiting load value.

While the tractive force is preset based on this condition, the load acting on the steering linkage can be limited. This especially makes it possible to design the steering linkage to be correspondingly lighter, thus reducing the overall vehicle weight and the fuel consumption of the vehicle.

In one preferred embodiment, the load that acts on the steering linkage, which is taken into account when presetting the tractive force, comprises a force, especially a tensile-compressive force, in one or more tie rods of the steering device. Especially with tie rods having small cross sections, the forces acting in them can limit the forces capable of being transmitted to the wheels. While a force in a tie rod is allowed for in presetting the tractive force of the electrical steering gear, the loading of the tie rod can be limited and this can thus be designed to be lighter.

In one preferred embodiment, the tractive force is preset to be lower than a tractive force preset with an effective force limit value, especially a preset one, if the effective force exceeds this effective force limit value. Especially, if the effective and tractive force serial and/or parallel to the load are superimposed or added, such a low tractive force can compensate for an effective force exerted by the driver which exceeds a preset effective force limit value. In a further development, the tractive force is preset to drop with increasing effective force, especially in strictly monotone fashion, preferably linear, if the effective force exceeds an effective force limit value.

What is meant here by a lower tractive force, while allowing for the sense of direction, especially is a tractive force, which gives less support to the active force, especially a tractive force acting less in the direction of the effective force and a tractive force that even acts counter to the effective force, i.e. acts opposite or with a reversed sign on the steering linkage. Counteracting tractive and effective forces within the meaning of the present invention attempt to move a wheel in opposite directions. What is understood here especially by a tractive force that drops, is correspondingly a tractive force that, if the effective force exceeds the effective force limit value, initially drops in amount a further-increasing effective force in amount, and if necessary even alters the direction and the sign, under a tractive force that becomes strictly monotonic (linear) corresponding to a tractive force with a negative (constant) gradient. A dropping tractive force can especially be preset in that for a first effective force, which exceeds the effective force limit value in amount, a first tractive force is preset, which is less in amount than the tractive force preset with the effective force limit value, and for at least one additional effective force, which for its part exceeds the first effective force in mount, a tractive force is preset which acts in the direction of the first tractive force and is smaller in amount than it, or even acts in the opposite direction.

In one preferred embodiment, the preset effective force limit value is at most 120 Nm, especially 100 Nm at most, preferably in a drag link coupled with a steering means, especially a steering wheel. What is understood by coupled here especially is action-connected mechanically, i.e. that a force in one component evokes a corresponding force in a component coupled therewith.

In a preferred embodiment, the tractive force is preset so that the load at least in essence corresponds to the load limit value, if the effective force exceeds a preset effective force limit value. Thus on the one hand, if necessary, the wheels can be actuated with a maximum load, while on the other hand, the steering linkage can be designed to be light.

Depending on the kinematics of the steering linkage, the load acting on the steering linkage can vary with the tractive and effective load being equal. While in a preferred embodiment, the preset effective force limit value is dependent on steering angle, for various settings of the steering linkage it can be ensured that the load acting on the steering linkage does not exceed the load limit value. The steering angle can be detected by a steering angle detection means, for example a steering angle turning sensor, angle encoder or the like.

In a preferred embodiment, the effective force exerted on the steering linkage which is detected is an operating force exerted by a user on a steering means.

This can be detected directly or indirectly, preferably by means of a torque sensor, which is placed on a drag link coupled with the steering means. Also in the same way the load acting on the steering linkage itself can be detected as the effective force exerted on the steering linkage, for example by one or more force measurement sensors, which are situated on one or more tie rods.

According to one aspect of the present invention, the controls of the steering device exhibit a means for presetting a tractive force exerted by the electrical steering gear, based on the condition, or so that, a load acting on the steering linkage, which especially can be a tensile-compressive force in a tie rod, does not exceed a preset load limit value.

In a preferred embodiment, this means is set up to preset the tractive force to be lower than a tractive force preset with an effective force limit value, especially dropping with increasing effective force, and especially opposite to the effective force, if the effective force exceeds this effective force limit value, which preferably amounts to 120 Nm at most, especially 100 Nm at most.

In a preferred embodiment, the means is set up to preset the tractive force so that the load, at least in essence, corresponds to the load limit value, if the effective force exceeds a preset effective force limit value, which preferably amount to 120 Nm at most, especially 100 Nm at most.

In a preferred embodiment, the means is set up so that the preset effective force limit value depends on steering angle.

In a preferred embodiment, the detection means can be set up so that the effective force exerted on the steering linkage, which is detected by it, comprises especially an operating force exerted on a steering means by an operator, and/or so that the effective force exerted on the steering linkage that is detected by it, is especially the load acting on the steering linkage.

Figure 1:
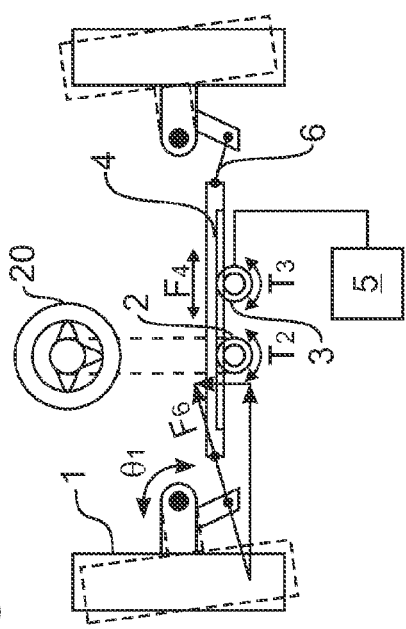
Figure 3:
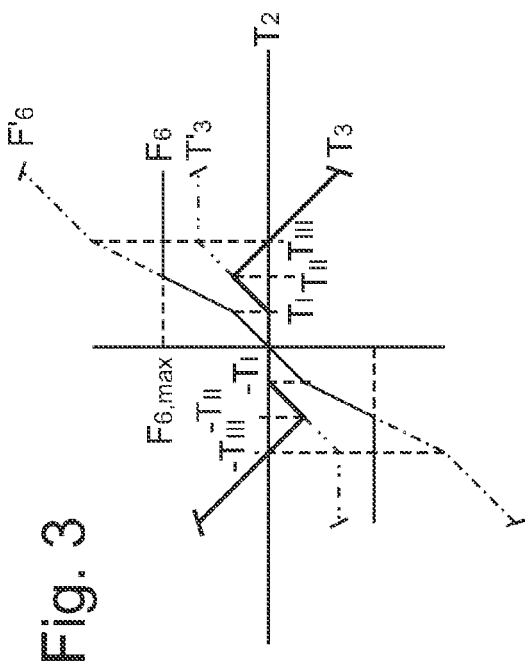

Additional advantageous embodiments of the present invention are gleaned from the subordinate claims and the specification of preferred embodiments that follow. For this, the following are shown, partially in schematic fashion:

FIG. 1: a steering device with an electrical steering gear for a motor vehicle according to one embodiment of the present invention;

FIG. 2: a method to control the electrical steering gear of FIG. 1;

FIG. 3: forces in the steering device of FIG. 1; and

FIG. 4: a computer program according to one embodiment of the present invention.

FIG. 1 shows a steering device for a passenger car according to one embodiment of the present invention with two steerable front wheels 1. They are coupled via tie rods 6 with a steering rack 4, so that a horizontal shifting of the steering rack 4 in FIG. 1 causes the wheels 1 to turn about their axes of rotation (perpendicular on the FIG. 1 drawing plane).

For this, on the one hand, a drag link 2, which is connected with a steering means in the form of a steering wheel 20, is coupled via a worm gear with steering rack 4. Parallel to this, an output shaft of an electrical steering gear in the form of an electric motor 3 is coupled via an additional worm gear with steering rack 4, which is governed by a controller 5. The kinematics shown serve in purely exemplary fashion for further explanation; the electric motor could for example be serially connected directly with the drag link and/or drag link and/or electric motor coupled directly with the tie rods.

If the driver applies a torque to steering wheel 20, this causes an effective force in the form of a torque $T_2$ in drag link 2, which is detected by a detection means in the form of a torque sensor and acting as a shearing force on steering rack 4 of the steering linkage. If the electric motor exerts a torque on its output shaft, this causes a tractive force in the form of a torque $T_3$, which likewise acts as a shearing force on steering rack 4 of the steering linkage. The two torques $T_2$, $T_3$ add up to a shearing force $F_4$ in steering rack 4, which for its part evokes tensile or compression forces $F_6$ in the tie rods 6. Aided by FIG. 1, one can perceive that these loads $F_6$ depend on the steering angle $\theta_1$.

In FIG. 3, the forces for a traditional design are drawn in as (double) dot-and-dash lines: depending on the torque $T_2$ detected by the torque sensor in drag link 2, which is shown as the abscissa of FIG. 3, the tractive force $T'_3$ (double dots and dashes in FIG. 3) of the electric steering drive 3 is preset. In an area of play $T_2 \in [-T_I, T_I]$ no tractive force $T'_3$ is generated, so that the load $F'_6$ (a dashed-dot line in FIG. 3) in the tie rods 6 corresponds directly to effective force $T_2$. If effective force $T_2$ exceeds the area of play $[-T_I, T_I]$, the electrical steering drive 3 exerts a tractive force $T'_3$, which is proportional to effective force $T_2$, so that the resulting load $F'_6$ is amplified (FIG. 3: $T_2 \in \{[-T_{III}, -T_I] \cup [T_I, T_{III}]\}$). If the effective force $T_2$ exceeds an upper limit $T_{III}$, then a constant tractive force $T'_3$ is exerted. Thus when the steering wheel 20 is turned even more emphatically, i.e. a further increasing effective force $T_2$, then the load $F'_6$ is increased in the tie rods 6, even when the tractive force $T'_3$ is reduced (not shown) after a certain duration of time.

According to an embodiment of the present invention, in a first step S10, a load limit value $F_{6, max}$ is preset for the load $F_6$ acting on the tie rods 6. From this, in a second step S20, if necessary in dependence on the steering angle $\theta_1$, the pertinent force $F_4$ in the steering rack 4 is determined. Since this is derived cumulatively from the tractive and effective force $T_2$, $T_3$, the tractive force $T_3$ (solid line in FIG. 3) can be preset in a third step S30 in dependence on the effective force $T_2$, so that the force $F_6$ acting on the tie rods 6 (also a solid line in FIG. 3) does not exceed the preset load limit value $F_{6, max}$.

In a computer-implemented method or a computer program according to one embodiment of the present invention, which proceeds in the controller 5, for this an effective force limit value $T_{II}$ is preset. As explained above with reference to the traditional version depicted by dual-dots-and-dashes, in an area of play $T_2 \in [-T_I, T_I]$ no tractive force $T_3$ is generated, so that the load $F_6$ in the tie rods 6 corresponds directly to the effective force $T_2$. For this, as shown in FIG. 4, in a step S32 of the computer program a check is done of whether the effective force $T_2$ detected in a step S31 lies in the area of play $T_2 \in [-T_I, T_I]$. If this is the case (S32: "Y"), no tractive force $T_3$ is preset (S36: $T_3 = 0$). Otherwise (S32: "N") the computer program continues with step S33.

If the effective force $T_2$ exceeds the area of play $[-T_I, T_I]$, then the electrical steering gear 3 exerts a tractive force $T_3$, which is proportional to effective force $T_2$, so that the resulting load $F_6$ is amplified (FIG. 3: $T_2 \in \{[-T_{II}, -T_I] \cup [T_I, T_{II}]\}$). For this, as shown in FIG. 4, in steps S33 and S35 of the computer program, a check is done of whether the effective force $T_2$ in terms of amount exceeds the area of play, but still is under the preset effective force limit value $T_{II}$. If this is the case (S33 or S35: "Y"), then a tractive force $T_3$ is preset that is proportional to the effective force $T_2$ (S33, S37: $T_3 = P \times (T_2 - T_I)$; S35, S39: $T_3 = P \times (T_2 + P_I)$ with the proportionality factor $P > 0$). Otherwise (S33, SS35: "N") the computer program continues with the particular following step S34 or S40.

If the effective force $T_2$ also exceeds the preset effective force limit value $T_{II}$, then, based on the tractive force $T_3$ ($T_{II}$) preset with the effective force limit value $T_{II}$, the tractive force $T_3$ again is preset to drop in linear fashion and even with opposite sign, if the effective force exceeds the effective force limit value $T_{III}$, which coincides in the embodiment example with the upper limit $T_{III}$. For this, as shown in FIG. 4, in step S34 the computer program does a check of whether the effective force $T_2$ is exceeding the preset effective force limit value $T_{II}$, and in this case (S34: "Y") presets a tractive force $T_3$, which drops in correspondence to the effective force $T_2$ (S38: $T_3 = P \times (2T_{II} - T_I - T_2)$). If all of the previous queries S32 to S35 have been negative, then the negative effective force $T_2$ exceeds in amount the preset effective force limit value $T_{II}$ ($T_2 < -T_{II}$). In this case also (S35: "N"), in step S40 the computer program presets a tractive force $T_3$, which drops in correspondence to the effective force $T_2$ (S39: $T_3 = -P \times (2T_{II} - T_I + T_2)$).

In steps S10 to S30, the effective force limit value $T_{II}$ can be uniformly preset for all steering angles $\theta_1$. Likewise it can also be preset differently for different steering angles $\theta_1$. In this case, in steps S31 to S40 of the computer program, the particular corresponding effective force limit value $T_{II} = T_{II} (\theta_1)$ is used.

Especially to be perceived in FIG. 3 is that the load $F_6$ corresponds to the load limit value $F_{6, max}$, in case the effective force $T_2$ exceeds a preset effective force limit value $T_{II}$. Until then, the power steering that is known per se can be provided. Thus, on the one hand, the tie rods 6 can be designed to be light, and on the other hand, the driver has available a desired power steering as much as possible.

In the embodiment example, the effective force limit value $T_{II}$ amounts to about 90 Nm and thus is the force which is applied by the driver during a so-called curb push-away test.

The controller 5 can comprise a digital microprocessor unit (CPU) data-connected with a storage system and a bus system. The CPU is configured to process commands which are executed in a program situated in a storage system, to detect input signals from a data bus and/or issue output signals to the data bus. The storage system may comprise various storage media such as optical, magnetic, solid and/or other permanent media. The program can be so constituted that it embodies the method described here or is capable of carrying it out so that the CPU can execute the steps of such methods and thus can govern the steering device.

Although in the previous specification, exemplary embodiments are described, let it be mentioned that a plurality of variations is possible. Also let it be mentioned regarding the exemplary embodiments that these are mere examples which in no way limit the scope of protection, the applications and the design. Rather, a guideline is provided to one skilled in the art by the previous specification for implementation of at least one exemplary embodiment, wherein various alterations, especially regard to the function and arrangement of the components described, may be undertaken without departing from the scope of protection as proceeds from the claims and these equivalent combinations of features.

| List of reference symbols | |
|---|---|
| 1 | wheel |
| 2 | drag link (steering linkage) |
| 3 | electric steering gear |
| 4 | steering rack (steering linkage) |
| 5 | controller |
| 6 | tie rod (steering linkage) |
| 20 | steering wheel |
| $T_2$ | Effective force (torque induced by driver in drag link 2) |
| $T_3$ | Tractive force |
| $F_4$ | Shear force in steering rack 4 |
| $F_6$ | Load in tie rod 6 |
| $F_{6, max}$ | Load limit value |
| $T_{II}, T_{III}$ | Effective force limit value traditional version |
| $T_I$ | area of play |

The invention claimed is:

1. A method for controlling an electrical steering gear for a motor vehicle, said method comprising a controller for detecting an effective force applied to a steering linkage, and applying a tractive force by the electrical steering gear where the tractive force is preset based on a condition that a load that includes an effective force and tractive force that is acting on the steering linkage does not exceed a preset load limit value, wherein the tractive force is preset at an effective force limit value in a linear fashion such that the tractive force is repeatedly preset to drop as the effective force increases and counter to the effective force, if the effective force exceeds the effective force limit value.

2. The method according to claim 1, wherein the load acting on the steering linkage includes a tensile-compressive force in a tie rod.

3. The method according to claim 1, wherein the preset effective force limit value at most is 120 Nm.

4. The method according to claim 1, wherein the tractive force is preset so that the load at least corresponds to the load limit value if the effective force exceeds a preset effective force limit value.

5. The method according to claim 1, wherein the preset effective force limit value is steering-angle-dependent.

6. The method according to claim 1, wherein the effective force applied to the steering linkage includes an operating force applied by an operator to a steering device.

7. The method according to claim 1, wherein the effective force applied to the steering linkage includes the load acting on the steering linkage.

8. A steering system for a motor vehicle comprising a steering device able to be operated by a driver, a steering linkage for controlling wheels of the vehicle, an electrical steering gear for exerting a tractive force on the steering linkage, a detection means for detecting an effective force exerted on the steering linkage and a controller for controlling the electric steering gear, said controller programmed to apply a tractive force of the electrical steering gear that is preset based on a condition that a load that includes effective force and tractive force that is acting on the steering linkage does not exceed a preset load limit value, wherein the tractive force is preset to be lower than a tractive force preset at an effective force limit value in a linear fashion that drops as the effective force increases and counter to the effective force, if the effective force exceeds the effective force limit value.

9. The steering system according to claim 8, wherein the tractive force is preset so that the load at least corresponds to the load limit value if the effective force exceeds a preset effective force limit value.

10. The steering system according to claim 9, wherein the preset effective force limit value is steering-angle-dependent.

11. A computer program comprising a program code, which is stored on a medium readable by a computer, for implementing a method for controlling an electrical steering gear for a motor vehicle, said computer program code being programmed for detecting an effective force applied to a steering linkage, and applying a tractive force by the electrical steering gear that is preset based on a condition that a load that includes effective force and tractive force that is acting on the steering linkage does not exceed a preset load limit value, wherein the tractive force is preset to be lower than a tractive force preset at an effective force limit value in a linear fashion such that the tractive force is repeatedly preset to drop as the effective force increases and counter to the effective force, if the effective force exceeds the effective force limit value.

12. The computer program according to claim 11, wherein the load acting on the steering linkage includes a tensile-compressive force in a tie rod.

13. The computer program according to claim 11, wherein the preset effective force limit value at most is 120 Nm.

14. The computer program according to claim 11, wherein the tractive force is preset so that the load at least corresponds to the load limit value if the effective force exceeds a preset effective force limit value.

15. The computer program according to claim 11, wherein the preset effective force limit value is steering-angle-dependent.

16. The computer program according to claim 11, wherein the effective force applied to the steering linkage includes an operating force applied by an operator to a steering wheel.

17. The computer program according to claim 11, wherein the effective force applied to the steering linkage includes the load acting on the steering linkage.

* * * * *